Dec. 21, 1926.  
W. A. ALLEN  
RADIATOR SHUTTER  
Filed July 23, 1923
1,611,845
2 Sheets-Sheet 1
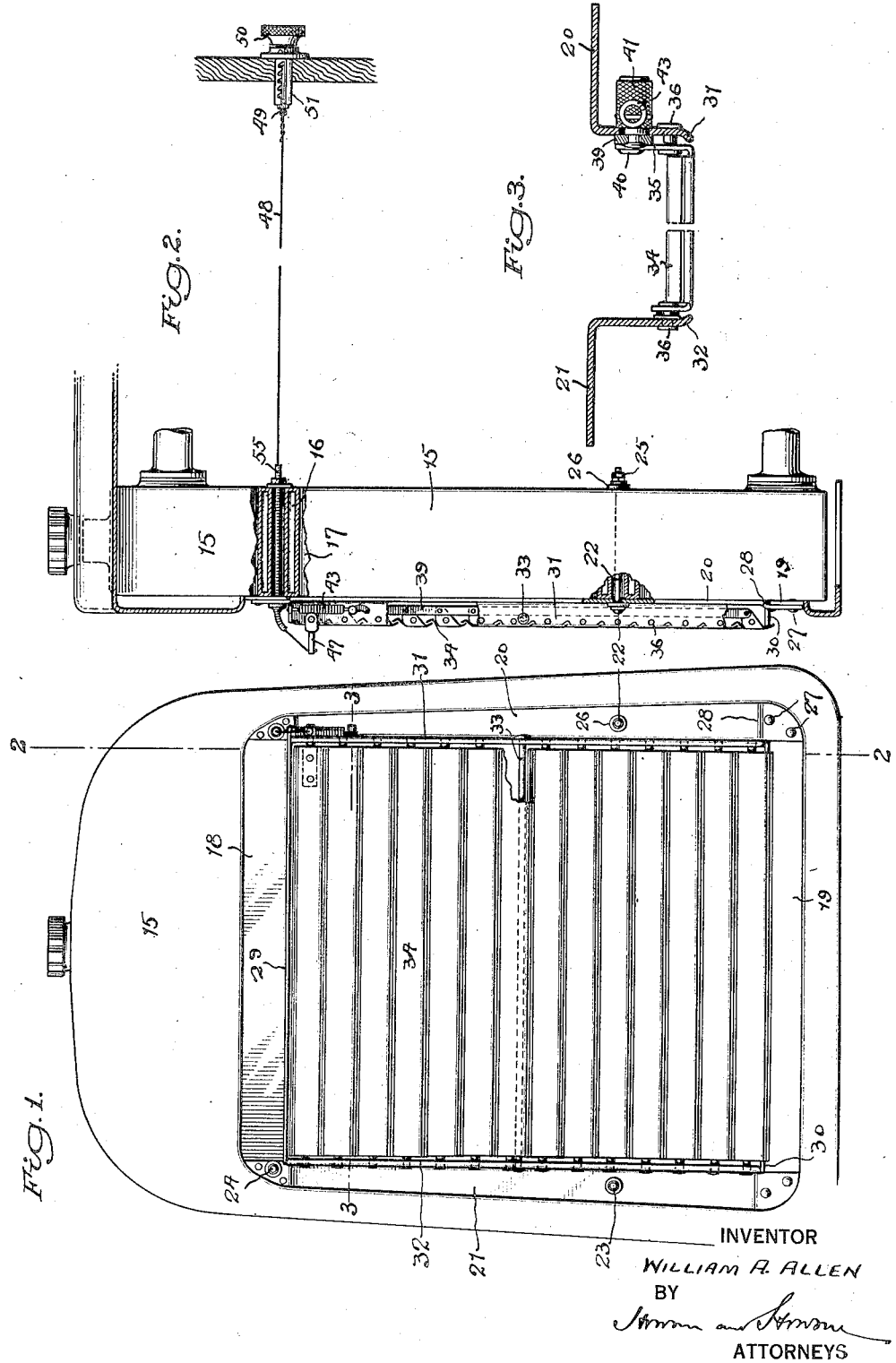
INVENTOR  
WILLIAM A. ALLEN  
BY  
ATTORNEYS Dec. 21, 1926.
W. A. ALLEN
RADIATOR SHUTTER
Filed July 23, 1923
1,611,845
2 Sheets-Sheet 2
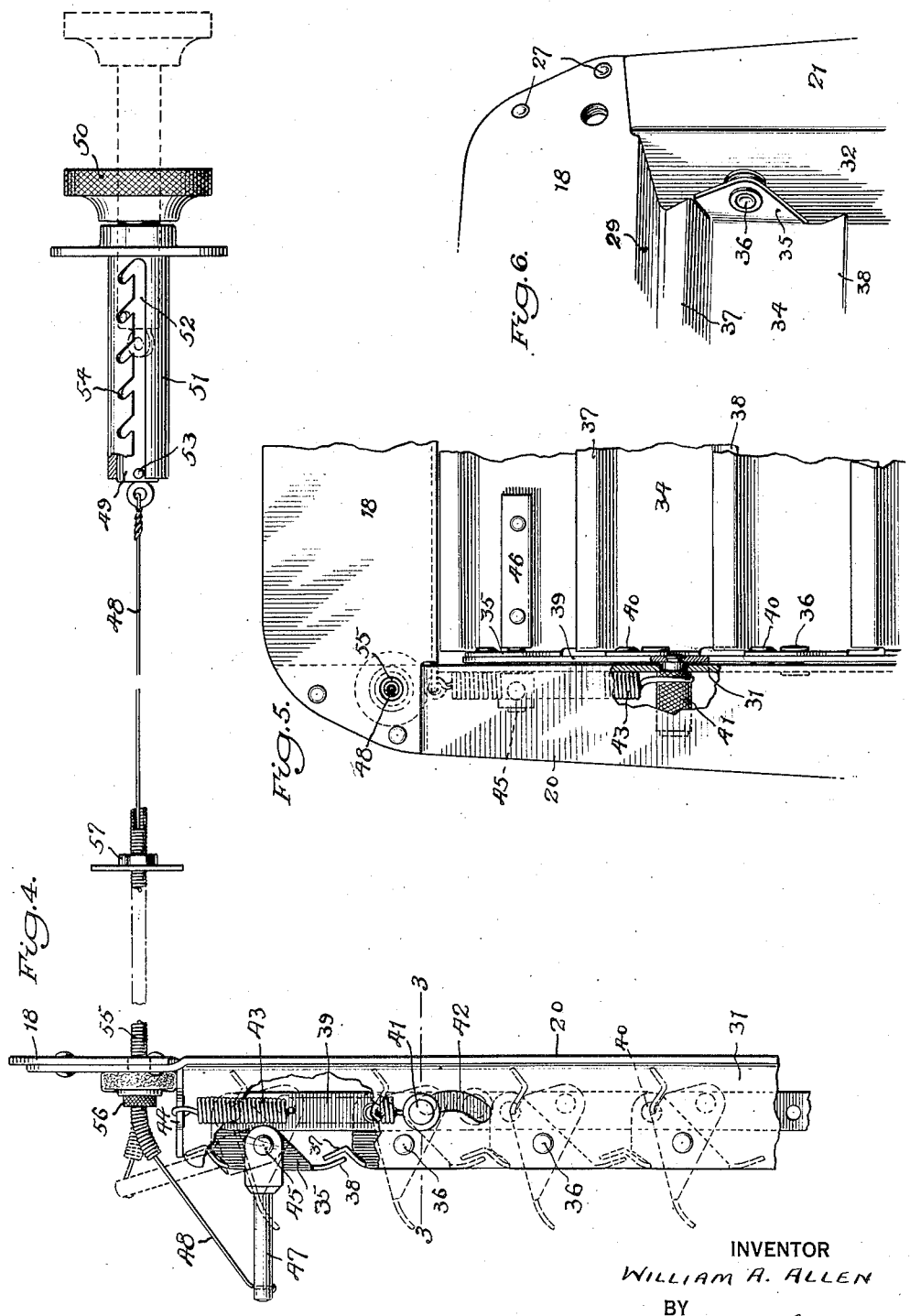
INVENTOR
WILLIAM A. ALLEN
BY
ATTORNEYS Patented Dec. 21, 1926.

1,611,845

UNITED STATES PATENT OFFICE.

WILLIAM A. ALLEN, OF YONKERS, NEW YORK, ASSIGNOR TO THE ALLEN AUTO SPECIALTY COMPANY, OF NEW YORK, N. Y., A CORPORATION OF NEW YORK.

RADIATOR SHUTTER.

Application filed July 23, 1923. Serial No. 653,328.

My invention relates to automobile radiator shutters, and the object of my invention is to provide a shutter of economical construction and efficient operation having certain features of improvement hereinafter described or shown in the accompanying drawings, in which—

Fig. 1 is a broken front elevation of a shutter in which my invention is embodied in one form;

Fig. 2 is a broken side elevation thereof;

Fig. 3 is a broken section on the line 3—3, Fig. 1;

Fig. 4 is a broken side elevation of the shutter drawn to enlarged scale;

Fig. 5 is a broken rear elevation of the shutter; and

Fig. 6 is a perspective of a detail.

My present invention provides an all-year-round shutter front adapted to be permanently installed at the front of the radiator, and while maintaining some of the advantages of the construction shown in my prior Patent No. 1,449,367, presents certain improvements thereover. A typical radiator 15 is shown in Figs. 1 and 2, and is provided with the usual honeycomb having cells 16 for the circulating water, and intervening air passages 17.

My improved shutter front for the radiator comprises a skeleton frame of four marginal sheet metal frame bars 18, 19, 20 and 21, the outer boundaries of which may be varied to harmonize with the outline of the radiator 15. The frame lies flat against the face of the radiator and embraces its honeycomb area, but sufficiently overlaps the latter to permit the passage of securing bolts 22, 23 and 24 through certain of the marginal passages 17 of the honeycomb, behind which the bolts are secured by nuts 25. Interposed between the bolt elements and the radiator at the front and back of the latter, are heavy washers 26 of felt or other suitable resilient material, which take up the expansion and contraction of the bolts under varying temperature conditions, and insure the maintenance of the shutter front snugly in position and free from rattle regardless of the slight elongation of the bolts 22 when heated.

At the several corners of the frame, the meeting ends of the frame plates overlap and are secured together by rivets 27. Preferably one or other of the frame plates at each corner is offset, as at 28, to maintain the radiator faces of the several plates in a plane to snugly fit against the radiator face. Each frame plate at its inner margin is forwardly offset to form the several boundary flanges 29, 20, 31 and 32 which surround the shutter opening. At a point approximately intermediate the ends of the shutter opening and extending between the opposite side flanges 31 and 32, is a stiffening bar 33 so located that it does not interfere with the operation of the neighboring shutter slat.

Arranged within the frame opening is a series of shutter slats 34, each comprising a strip of sheet metal having offset end flanges 35 secured by pivot pins or rivets 36 to the opposite side flanges 31 and 32 of the frame. The upper margins of the several slats are offset to form channels 37, which are overlapped by the inwardly offset margins 38 of the super-adjacent shutters, thus forming an interlocking engagement between the several slats which effectively baffles the flow of air through the shutter when the latter is in closed position. It will be noted further that in closed shutter position the offset margin 38 of the lowermost slat of the series overlaps the edge of the flange of the bottom frame plate, and thus forms an effective rain shed. It will be further noted that the outer margins of the side flanges 31—32 of the frame are bevelled inward, thus not only imparting a better finish to these elements, but also concealing to a great extent the pivot joints of the slats and the connecting bar 39.

At one side of the shutter frame, and adjacent the inner face of the flange 31 of frame plate 20, is arranged a vertically movable operating bar 39 connected by pins 40 to the several side flanges 35 at one end of the several slats and eccentric to the pivot pins 36 by which they are mounted in the frame. A stud 41 connected to the operating bar 39 passes through an arcuate slot 42 in the side flange 31. The stud forms an anchorage for one end of the return spring 43, the opposite end of which is attached to the outwardly projecting lug 44 of the flange 29 of the top frame bar 18. The spring 43 is stressed to draw the stud 41 to the upper end of the slot 42, in which position the actuating bar 39 holds the slats 34 in closed position.

The pivot pin 45 for the top slat 34 is rigidly anchored to the latter by a riveted base 36 and projects through the flange 31 of the frame member 20 a sufficient distance to receive the hub of a lever arm 47. To the free end of the latter is secured a pull wire or cable 48 which extends through the radiator to the dash of the car, at which point it is secured to a sliding block 49 provided with a hand grip 50. The block passes through the guide sleeve 51 slotted at 52 to receive the stop pin 53 on the block 49, and having lateral bays 54 into which the stop pin may be entered by rotation of the hand grip 50 after the block has been longitudinally displaced to operate the crank arm 47.

In order to guide the pull wire 48 and to protect the radiator honeycomb from injury, I provide a flexible guide member 55 adapted to pass through one of the passages 17 in the radiator honeycomb, and through which the wire 48 is itself threaded. The flexible member 55 is preferably in the form of a tightly coiled wire, thus affording in effect a flexible hollow bolt upon which may be threaded holding nuts 56 and 57. This flexible coil passes through the shutter frame and thus serves not only as the pull wire guide, but also as the securing means by which one corner of the shutter frame is held in position.

To operate the shutter it is only necessary to shift the block 49 in the guide 51 on the dash, the motion being transmitted through wire 48 to the lever arm 47 on pivot pin 45, and by the latter through its slat 34 to the operating bar 39. Inasmuch as all of the slats are connected to the latter, they move in unison therewith to such position as may be determined by the operator. In order to close the shutter it is merely necessary to release the stop pin 53 from its detent bay 54 of the guide, whereupon the return spring 43 lifts the operating bar 39 and through the latter swings the several shutters to closed position.

The shutter slats and frame are all readily struck from sheet metal and pressed to shape. The riveting together of the overlapped frame plates and their flanges, affords a rigid frame structure. The shutter slats are readily assembled in the frame by means of the pivot pins which pass through the end flanges of the slats and frame flanges, and are headed to retain them in place. The operating devices are positive and simple and readily installed. A minimum of parts is employed while nevertheless all necessary structural features are present for efficient performance.

Various modifications in detail will readily occur to those skilled in the art, which do not depart from what I claim as my invention.

I claim—

1. In a shutter appliance for automobile radiators, a shutter frame adapted to lie against a radiator front, and means for securing the same in position, said means including a tightly coiled wire, and nuts screwing thereon and bearing against the front of the shutter frame and against the back of the radiator core and forming in effect a securing bolt for the shutter frame.

2. In a shutter appliance for automobile radiators, a skeleton shutter frame comprising sheet metal plates riveted together, and having offset flanges bounding the shutter opening, one of said flanges having a projecting lug, a series of shutter slats pivoted between opposite flanges, a bar interconnecting said slats for movement in unison and located adjacent the inner face of one of said flanges, a stud on said bar projecting through said flange, and a spring engaged between said stud and flange lug for operating the shutter series in one direction.

In testimony whereof I have signed my name to this specification.

WILLIAM A. ALLEN.